United States Patent
Palakonda et al.

(10) Patent No.: US 12,370,977 B2
(45) Date of Patent: Jul. 29, 2025

(54) PATH-BASED DETECTION OF USER APPROACH FOR PASSIVE ENTRY

(71) Applicant: FORD GLOBAL TECHNOLOGIES, LLC, Dearborn, MI (US)

(72) Inventors: Sathyanarayana Chary Palakonda, Northville, MI (US); Jeffrey Wallat, Bloomfield Hills, MI (US); Ivan Vukovic, Birmingham, MI (US); Kirsen J. Quan, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 146 days.

(21) Appl. No.: 18/353,504

(22) Filed: Jul. 17, 2023

(65) Prior Publication Data

US 2025/0026307 A1    Jan. 23, 2025

(51) Int. Cl.
*B60R 25/01* (2013.01)
*B60R 25/24* (2013.01)
*G07C 9/00* (2020.01)

(52) U.S. Cl.
CPC ............. *B60R 25/24* (2013.01); *B60R 25/01* (2013.01); *G07C 9/00309* (2013.01); *G07C 9/00658* (2013.01); *B60R 2325/101* (2013.01); *G07C 2009/00793* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 10,055,917 B2 | 8/2018 | Spahl et al. | |
| 11,210,877 B1 | 12/2021 | Amadi et al. | |
| 11,558,808 B1 * | 1/2023 | Fox | H04W 48/04 |
| 2013/0332007 A1 * | 12/2013 | Louboutin | H04M 1/724098 |
| | | | 701/1 |

(Continued)

FOREIGN PATENT DOCUMENTS

| | | |
|---|---|---|
| CN | 114445938 A | 5/2022 |
| CN | 114590222 A | 6/2022 |

(Continued)

*Primary Examiner* — John F Mortell
(74) *Attorney, Agent, or Firm* — Joseph Zane; Brooks Kushman P.C.

(57) ABSTRACT

Path-based approach to passive vehicle entry is provided. A vehicle receives messages over a first protocol from a mobile device, each of the messages indicating a heading of the mobile device and a current location of the mobile device. The vehicle and the mobile device pair responsive to the current location of the mobile device being within a first threshold distance to the vehicle. Responsive to the heading indicating that the mobile device is headed towards the vehicle and the current location of the mobile device being within a second threshold distance from the vehicle, the second threshold distance being closer to the vehicle than the first threshold distance, the vehicle activates one or more second transceivers to perform time of flight distance measurement between the vehicle and the mobile device to obtain more precise positional accuracy, and otherwise maintains the one or more second transceivers in a deactivated mode.

29 Claims, 9 Drawing Sheets

(56) References Cited

U.S. PATENT DOCUMENTS

| | | | | |
|---|---|---|---|---|
| 2014/0091903 A1* | 4/2014 | Birkel | ............... | B60R 25/241 |
| | | | | 340/5.64 |
| 2016/0088546 A1* | 3/2016 | Birch | ............... | G06Q 30/0261 |
| | | | | 455/456.3 |
| 2017/0225541 A1* | 8/2017 | Shimoda | ............... | B60H 1/248 |
| 2019/0066422 A1* | 2/2019 | Breer | ............... | H04W 4/20 |
| 2019/0279440 A1* | 9/2019 | Ricci | ............... | G06Q 10/20 |
| 2022/0286809 A1* | 9/2022 | Hasegawa | ............... | H04W 76/15 |
| 2023/0373437 A1* | 11/2023 | Baruco | ............... | B60R 25/305 |
| 2024/0080765 A1* | 3/2024 | DeLong | ............... | B60R 25/24 |

FOREIGN PATENT DOCUMENTS

| | | |
|---|---|---|
| CN | 115776723 A | 3/2023 |
| DE | 102021131485 A1 | 6/2022 |

\* cited by examiner

PATH-BASED DETECTION OF USER APPROACH FOR PASSIVE ENTRY

TECHNICAL FIELD

Aspects of the disclosure relate to a precise path-based approach to passive entry for vehicles.

BACKGROUND

Automotive customers have embraced Passive Entry and Passive Start (PEPS) systems, as these systems allow customers to enter the vehicle and drive away without having to physically handle a key. Phone-as-a-key (PaaK) allows the use of a smartphone to act as both a passive key and to provide traditional key fob functions such as unlock, lock, remote start, and lift gate access. PaaK may be implemented using Bluetooth Low Energy (BLE), which is an inbuilt technology in most smartphones on the market. The Connected Car Consortium (CCC) is working to implement Ultra-Wide Band (UWB) for phone localization to provide better localization compared to BLE localization approaches.

SUMMARY

In a first illustrative embodiment, a system for a path-based approach to passive vehicle entry includes a first transceiver of a vehicle configured to operate over a first protocol; one or more second transceivers of the vehicle configured to operate over a second protocol, the second protocol having shorter range but more precise positional accuracy than the first protocol; and one or more controllers of the vehicle. The one or more controllers of the vehicle are programmed to receive messages over the first protocol from a mobile device, each of the messages indicating a heading of the mobile device and a current location of the mobile device, pair the vehicle and the mobile device responsive to the current location of the mobile device being within a first threshold distance to the vehicle, and responsive to the heading indicating that the mobile device is headed towards the vehicle and the current location of the mobile device being within a second threshold distance from the vehicle, the second threshold distance being closer to the vehicle than the first threshold distance, activate the one or more second transceivers to perform time of flight distance measurement between the vehicle and the mobile device to obtain the more precise positional accuracy, and otherwise maintain the one or more second transceivers in a deactivated mode.

In a second illustrative embodiment, a method for path-based approach to passive vehicle entry includes receiving, to a vehicle, messages over a first protocol from a mobile device, each of the messages indicating a heading of the mobile device and a current location of the mobile device; pairing the vehicle and the mobile device responsive to the current location of the mobile device being within a first threshold distance to the vehicle; and responsive to the heading indicating that the mobile device is headed towards the vehicle and the current location of the mobile device being within a second threshold distance from the vehicle, the second threshold distance being closer to the vehicle than the first threshold distance, activate one or more second transceivers to perform time of flight distance measurement between the vehicle and the mobile device to obtain more precise positional accuracy, and otherwise maintain the one or more second transceivers in a deactivated mode.

In a third illustrative embodiment, a non-transitory computer-readable medium includes instructions for a path-based approach to passive vehicle entry that, when executed by one or more controllers of a vehicle, cause the vehicle to perform operations including to receive messages over a first protocol from a mobile device, each of the messages indicating a heading of the mobile device and a current location of the mobile device; verify, without pairing the mobile device, that the mobile device is on a list of devices authorized to access the vehicle; responsive to the verification indicating that the mobile device is authorized to access the vehicle, send a location of the vehicle to the mobile device to allow the mobile device to determine its distance to the vehicle; pair the vehicle and the mobile device responsive to the current location of the mobile device being within a first threshold distance to the vehicle; once paired, authenticate the mobile device using a passive key received to the vehicle from the mobile device; responsive to the vehicle verifying the passive key, allow one or more second transceivers operating over a second protocol to be activated responsive to the heading indicating that the mobile device is headed towards the vehicle and the current location of the mobile device being within a second threshold distance from the vehicle, the second threshold distance being closer to the vehicle than the first threshold distance; and responsive to the heading indicating that the mobile device is headed towards the vehicle and the current location of the mobile device being within the second threshold distance from the vehicle, activate the one or more second transceivers to perform time of flight distance measurement between the vehicle and the mobile device to obtain a more precise positional accuracy, and otherwise maintain the one or more second transceivers in a deactivated mode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It may be desirable for the vehicle to perform operations responsive to the user approaching the vehicle. For example, the vehicle may perform cabin preconditioning, opening of the lift gate, etc., in anticipation of use of those features. Yet, determining that a user is approaching a vehicle using the existing radio frequency (RF) sequence of low frequency (LF) and ultra-high frequency (UHF) communications may be difficult. Using the RF sequence, the vehicle may be unable to determine the user's precise direction of approach. Also, the RF sequence has a short detection range (e.g., below 5 meters), and requires the vehicle to monitor continuously, which may incur key-off load.

Aspects of the disclose use a multiple wireless technology approach to provide longer distance detection of the user (e.g., on the order of 100 meters). The approach activates communication interfaces based on user approach, direction, and position. User path prediction is used to prevent false vehicle alerts. The user mobile with its global navigation satellite system (GNSS) position and path prediction may prepare the vehicle and give it a sense of direction from where the user is arriving, so that the vehicle has more information rather than just received signal strength indicator (RSSI). For example, the vehicle can turn on only external UWB modules on one side of the vehicle once the vehicle identifies the direction from which the user is coming. Further aspects of the disclosure are discussed in detail with reference to the figures below.

Figure 1:
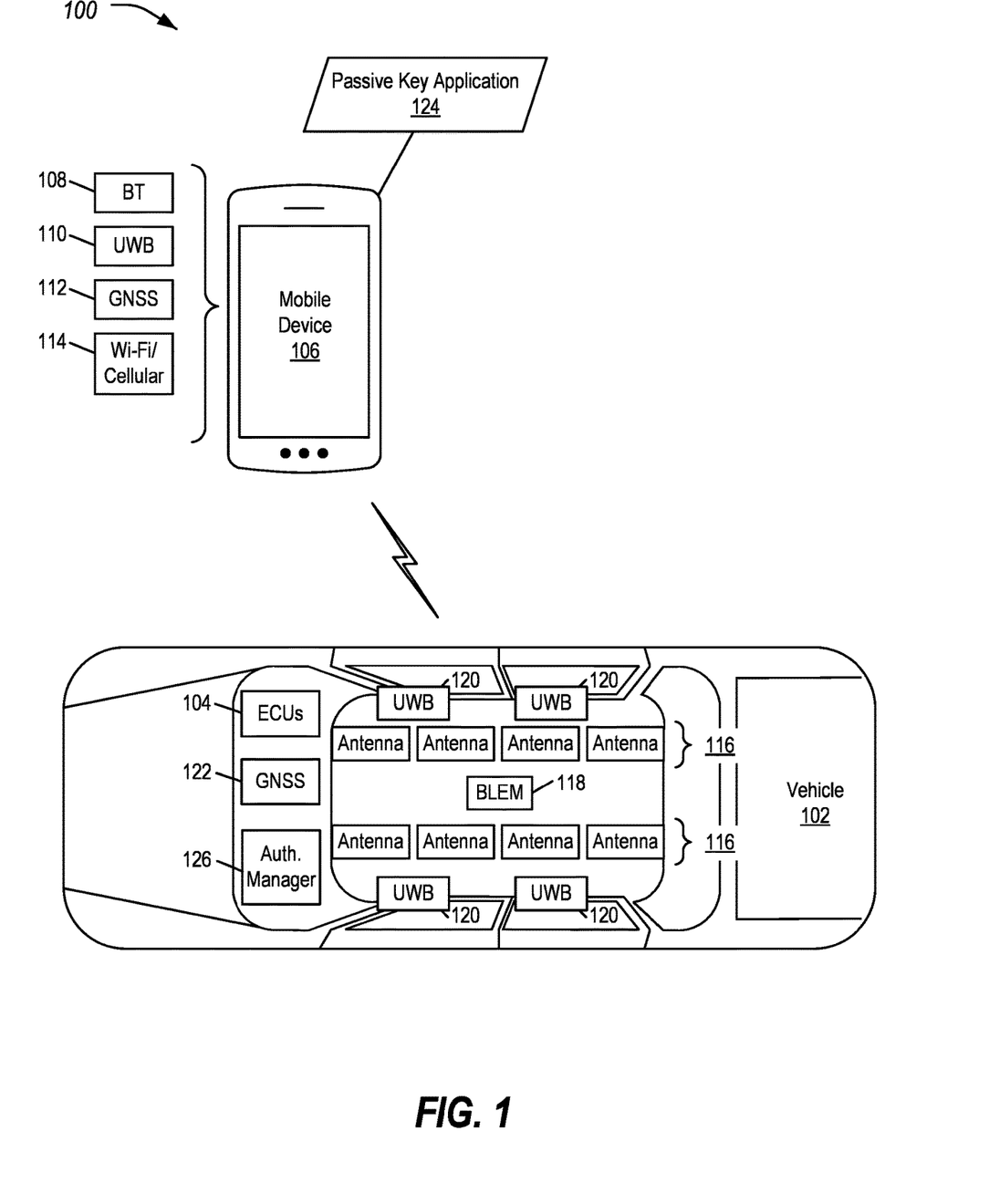
FIG. 1 illustrates an example system configured for precise path-based passive entry.

FIG. 1 illustrates an example system 100 configured for precise path-based passive entry. As shown, a vehicle 102 includes various electronic control units (ECUs) 104 supporting the functions of the vehicle 102. The mobile device 106 includes communications functionality such as a BLUETOOTH transceiver (BT) 108, a mobile UWB transceiver 110, and a mobile GNSS controller 112. The vehicle 102 also includes passive entry components configured to interact with the communications functionality of the mobile device 106, including an array of antennas 116, a BLE module (BLEM) 118, one or more UWB controllers 120, and a vehicle GNSS controller 122. As explained in detail herein, a passive key application 124 installed to the mobile device 106 may interact with an authentication manager 126 of the vehicle 102 to provide the precise path-based passive entry. It should be noted that the system 100 is only an example, and more, fewer, and/or differently located components may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The vehicle 102 may include a plurality of ECUs 104 configured to perform and manage various vehicle 102 functions under the power of the vehicle 102 battery and/or drivetrain. In some examples, the ECUs 104 may be discrete devices. However, the vehicle ECUs 104 may share physical hardware, firmware, and/or software, such that the functionality from multiple ECUs 104 may be integrated into a single ECU 104 or distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control module (PCM) may be configured to control engine and transmission components; an antilock brake system (ABS) controller configured to control brake and traction control components; an electric power-assisted steering (EPAS) controller configured to control steering assistance and adjust pull or drift compensation functions; advanced driver assistance systems (ADAS) such as adaptive cruise control or automate braking; and a headlamp control module (HCM) configured to control light on/off settings. The ECUs 104 may also include other powertrain or chassis components, an infotainment system configured to support voice command and BLUETOOTH interfaces with the driver and driver carry-on devices (e.g., the SYNC system provided by Ford Motor Company of Dearborn, MI), a connectivity controller such as a telematics control unit (TCU) configured to utilize an embedded modem to access networked devices external to the vehicle 102, electromechanical body controllers such as window or lock actuators, and trailer controller components such as light control and sensor data to support connected trailers.

The mobile device 106 may be any of various types of portable computing device, such as cellular phones, tablet computers, smart watches, laptop computers, portable music players, key fob, or other such devices brought into the vehicle 102 and having processing and communications capabilities. The mobile device 106 may include one or more processors configured to execute computer instructions, and a storage medium on which the computer-executable instructions and/or data may be maintained. The mobile device 106 may further include various wireless transceivers, such as a mobile BT 108 configured to provide BLUETOOTH and/or BLE functionality to the mobile device 106, a mobile UWB transceiver 110 configured to provide UWB functionality to the mobile device 106, a GNSS controller 112 configured to provide location services to the mobile device 106, as well as other functionality such as Wi-Fi and/or cellular transceivers 114 configured to provide wide area communications functionality to the mobile device 106.

The vehicle 102 may include an array of antennas 116 configured to facilitate communication between the mobile device 106 and the vehicle 102. For instance, one or more BLE transceivers may be used to detect the presence of the mobile UWB transceiver 110 of the mobile device 106. Or, a plurality of BLE transceivers may be connected to the antennas 116 to form a BLE array that may be used to triangulate and/or otherwise detect the location of the mobile UWB transceiver 110 of the mobile device 106. The BLE transceivers may be controlled by the BLEM 118, which may include a memory and a processor programmed to send and receive messaging between the mobile device 106 and the vehicle 102 (e.g., to provide for the performance of challenge-response sequences and/or to receive commands from the vehicle 102). As shown the vehicle 102 includes an array of eight antenna 116 about the perimeter of the vehicle 102 cabin, but it should be noted that implementations may include more, fewer, and/or differently located transceivers and/or antennas 116.

The vehicle 102 may also implement UWB capability along with BLE for localization. As shown, the vehicle 102 further includes UWB controller 120 configured to utilize the antennas 116 to send and receive messaging between the mobile UWB transceiver 110 of the mobile device 106 and the vehicle 102. For instance, a plurality of UWB controllers 120 may operate as transceivers connected to the UWB antennas 116. In the context of this disclosure, a component of a UWB capability can be a UWB transceiver. As compared to BLE, UWB can provide for more precise location determination. For instance, UWB can measure distance and location to an accuracy of on the order of 5 to 10 cm, while Wi-Fi, BLUETOOTH, and other narrowband radio systems typically reach an accuracy on the order of meters.

The mobile device 106 may also include a display configured to provide a user interface to a user. In some examples, the display may be touch-sensitive, and may be further configured to receive input from the user. Additionally, a passive key application 124 may include instructions that, when executed by the one or more processors of the mobile device 106, cause the mobile device 106 to perform operations to facilitate access to the vehicle 102. In an example, the passive key application 124 may cause the mobile device 106 to display a user interface to the display including controls like those of a key fob (e.g., lock, unlock, start, etc.).

In another example, the passive key application 124 may cause the mobile device 106 to interact as a passive entry device with the vehicle 102, providing presence information to the BLEM 118 and/or the UWB controller 120 that allows the vehicle 102 to detect that an authorized user of the vehicle 102 is nearby and/or approaching. By executing the passive key application 124 to control communication of the mobile device 106 with the vehicle 102, the mobile device 106 may be used to unlock, start, activate vehicle 102 features, or otherwise access the vehicle 102.

The passive key application 124 may allow for the authentication of the mobile device 106 to the vehicle 102 using an authentication manager 126 of the vehicle 102. The authentication manager 126 may be a controller of the vehicle 102 that is in communication with the BLEM 118 and UWB controller 120, as well as with other components of the vehicle 102, such as various ECUs 104, door locks, or the vehicle ignition interlock. The authentication of the mobile device 106 to vehicles 102 may utilize a PaaK feature implementation, ensuring a secure connection between the user mobile device 106 and a vehicle connectivity module (such as the BLEM 118 or UWB controller 120), whereby the user position can be localized utilizing the antennas 116.

Figure 2:
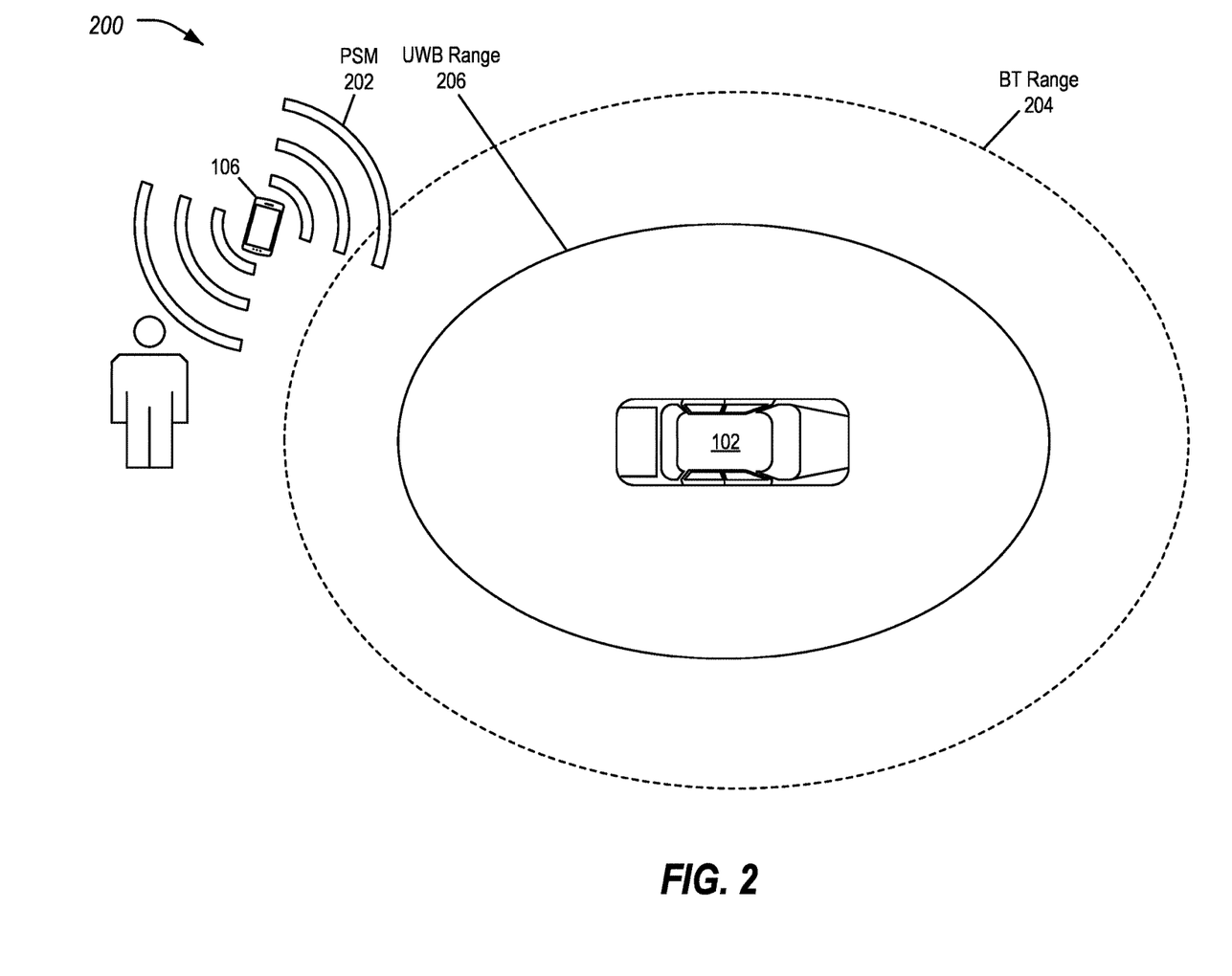
FIG. 2 illustrates an example of the operation of the BLE module and UWB controller of the vehicle for tracking the mobile device.

FIG. 2 illustrates an example 200 of the operation of the BLEM 118 and UWB controller 120 of the vehicle 102 for tracking the mobile device 106. In general, the mobile device 106 may broadcast messages 202 using the BT 108. These messages may, in an example, be PSM messages 202. Details of the contents of PSM messages 202 are discussed in detail in society of automotive engineers (SAE) standard documents J2735 and J2945, the contents of which are incorporated herein by reference in its entirety.

The PSM messages 202 may indicate the position and/or heading of the mobile device 106 as determined using the GNSS controller 112. In some examples the PSM messages 202 may further include a path prediction of the sender, e.g., determined based on extrapolating the previous positions, direction of travel, speed, change in speed, etc. of the sender device. For example, the mobile device 106 may track user position and user path prediction with the vehicle 102 a last known GNSS location of the vehicle 102 saved to the mobile device 106.

In another example, the mobile device 106 may predict or otherwise determine the path based on the what the navigation destination is. In an example, the vehicle 102 may have been parked in an unknown town or city and, after walking around, the user may want directions to return to the vehicle 102. In such an example, the user may utilize a navigation application of the mobile device 106 to navigate back to the vehicle 102. If the device navigation system has this information (that the user is heading back to the vehicle 102), then this information may be shared with the device's PaaK and PEPS application and/or otherwise be included in the PSM messages 202.

In yet another example, the mobile device 106 may use ML algorithms to determine that a most likely destination of the user is the vehicle 102. In this case also, the pathing information may be shared with the device's PaaK and PEPS application and/or otherwise be included in the PSM messages 202.

The vehicle 102 may utilize its BLEM 118 to receive these PSM message 202 over the BLUETOOTH transmission range 204, which may be on the order of 100 meters. Significantly, the BLUETOOTH transmission range 204 may be greater than the UWB transmission range 206. Responsive to the vehicle 102 detecting the approach heading of the user via the PSM messages 202, the vehicle 102 may activate the UWB controller 120 perform accurate UWB ranging to fine tune the user's location.

Figure 3A:
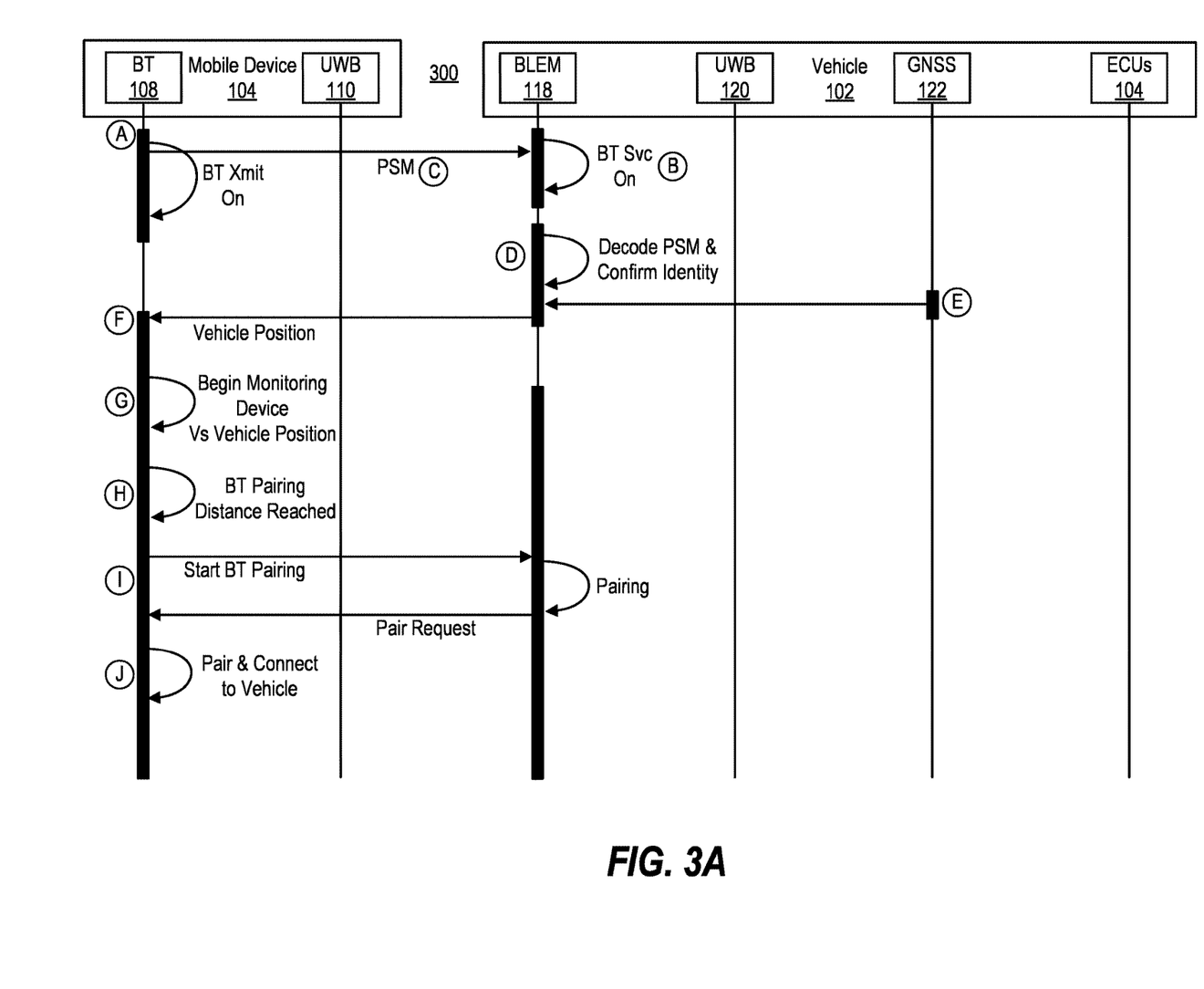
FIG. 3A illustrates aspects of a data flow for the precise path-based passive entry involving BLUETOOTH pairing of the mobile device and vehicle.
Figure 3B:
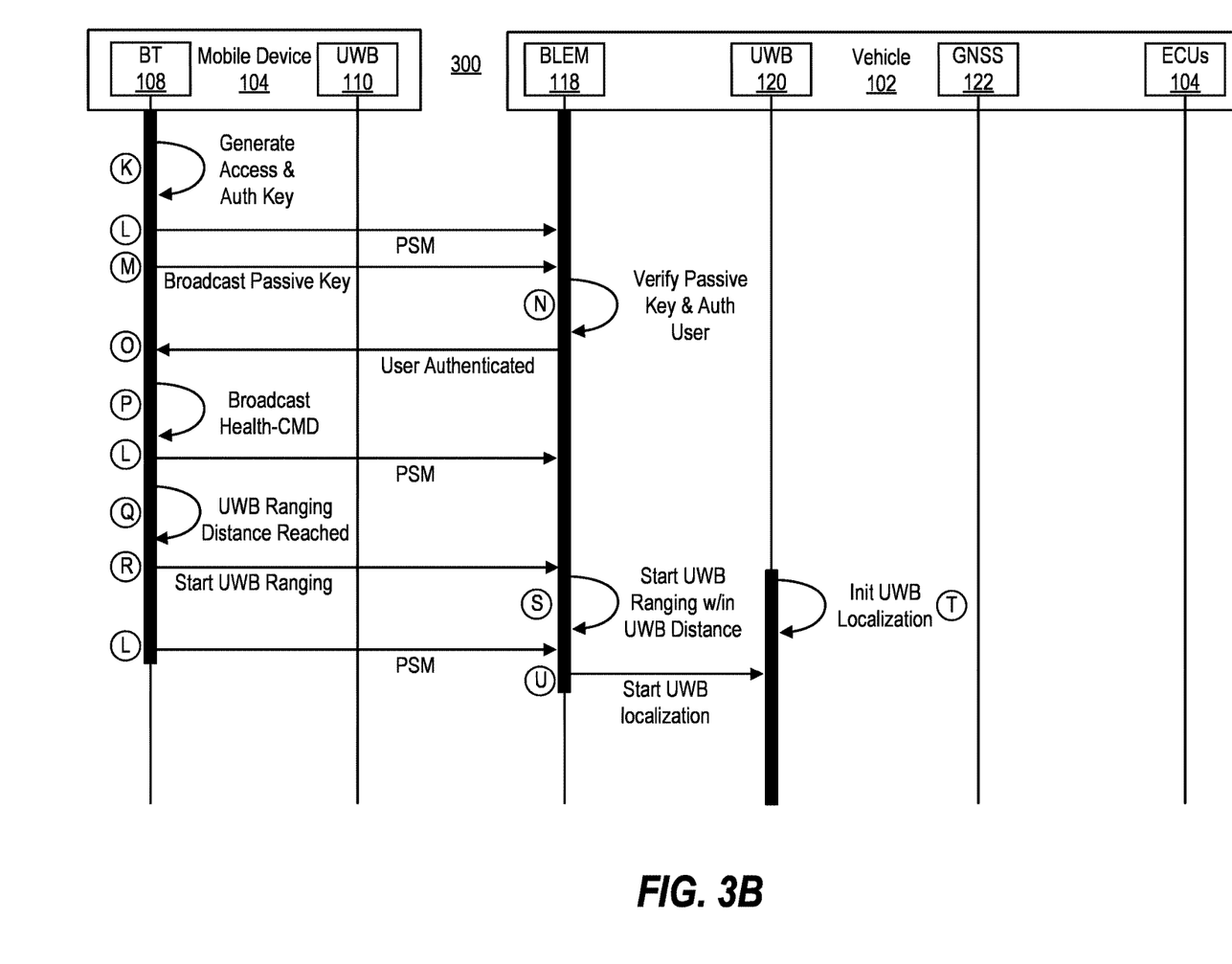
FIG. 3B illustrates aspects of the data flow for the precise path-based passive entry involving UWB ranging between the mobile device and vehicle.
Figure 3C:
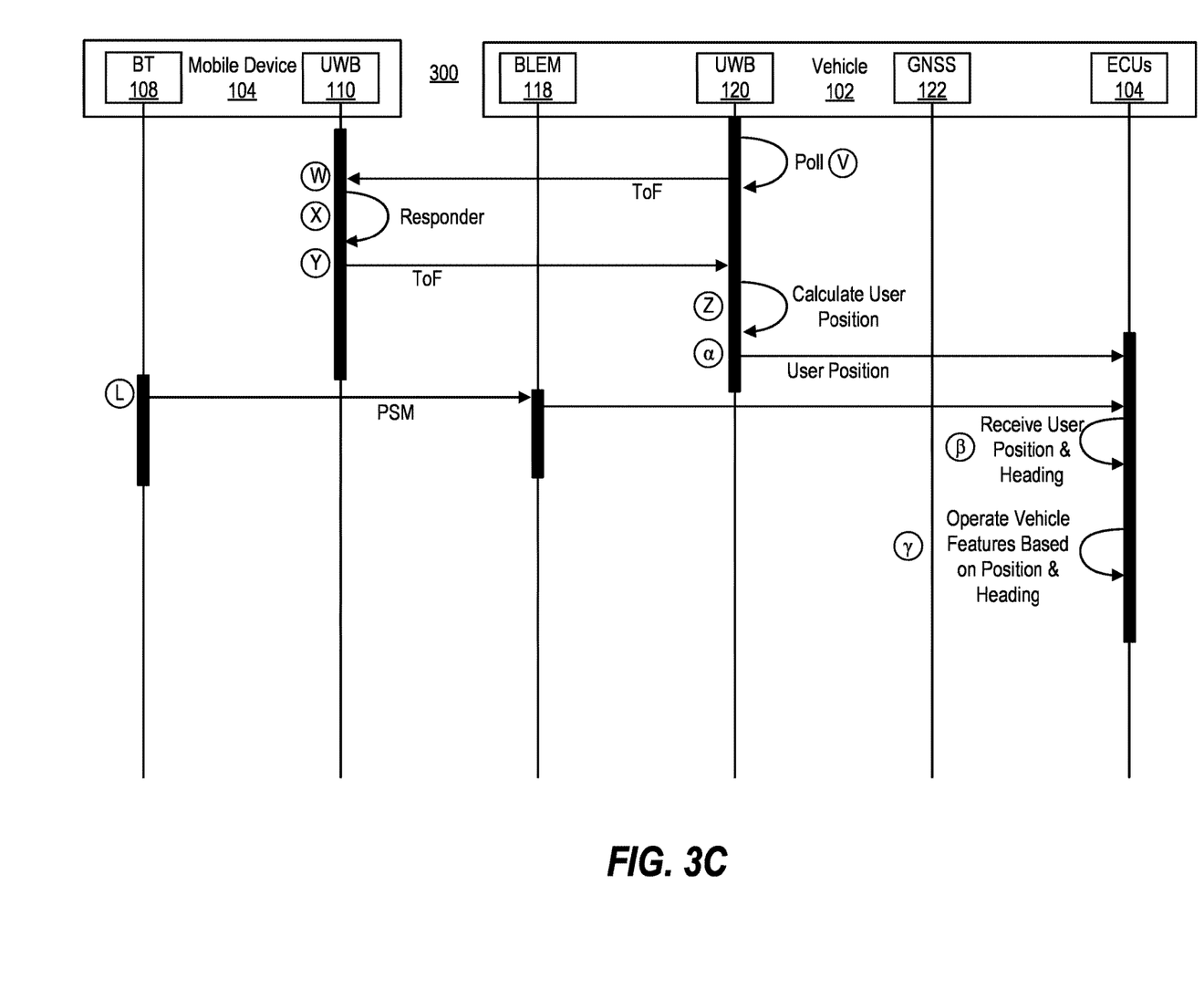
FIG. 3C illustrates aspects of the data flow for the precise path-based passive entry involving UWB polling and access control between the mobile device and vehicle.

FIG. 3A illustrates aspects of a data flow 300 for the precise path-based passive entry involving BLUETOOTH pairing of the mobile device 106 and vehicle 102. FIG. 3B illustrates aspects of the data flow 300 for the precise path-based passive entry involving UWB ranging between the mobile device 106 and vehicle 102. FIG. 3C illustrates aspects of the data flow 300 for the precise path-based passive entry involving UWB polling and access control between the mobile device 106 and vehicle 102.

Referring more specifically to FIG. 3A, at index (A) the mobile device 106 activates the BT 108 to broadcast PSM messages 202 periodically over BLUETOOTH. At index (B), the vehicle 102 activates its BLEM 118 to scan for broadcast PSM messages 202. At index (C), an example PSM message 202 is received by the vehicle 102.

At index (D), the vehicle 102 decodes the PSM message 202. The vehicle 102 may identify whether the PSM message 202 originated from a mobile device 106 that is in a friendly list of devices that are authorized to use the vehicle 102. For example, the PSM message 202 may include a media access control (MAC) or other identifier of the mobile device 106 that may be looked up into a database of allowed identifiers. If the identifier is found in the database, then the data flow 300 may proceed. If not, then the vehicle 102 may continue to await PSM messages 202 without proceeding (not shown).

In another example, the vehicle 102 and the mobile device 106 may have agreed to a security mechanism that involves signing the messages with the public keys whose private keys are known only to the corresponding side, mobile device 106 or the vehicle 102, respectively. The mobile device 106 and the vehicle 102 may not accept messages 202 from the other side unless the other side device is authenticated. One approach to such authentication may be to use pre-agreed signatures based on a public/private key set. The identifier may accordingly be used to determine for which of the incoming messages further security processing may be performed.

Additionally, certain fields in the PSM message 202, such as position, may be encrypted so only the vehicle 102 and/or mobile device 106 can view it after decryption. This process, which precedes the connection establishment, may be a different process compared to the authentication described during and after the pairing process.

At index (E), the vehicle 102 utilizes the vehicle GNSS controller 122 to determine a current position of the vehicle 102. Using this position, at index (F) the vehicle 102 sends a message over BLUETOOTH back to the mobile device 106 including the position of the vehicle 102. This location is received to the mobile device 106.

At index (G), the mobile device 106 initiates monitoring of the location of the mobile device 106 with reference to the location of the vehicle 102. In an example, the mobile device 106 may utilize its GNSS controller 112 to monitor the location of the mobile device 106. The mobile device 106 may compare its location to that of the vehicle 102 to determine the distance between the mobile device 106 and the vehicle 102. The mobile device 106 may also use a history of previously saved positions of the mobile device 106 to perform the user path prediction of the user of the mobile device 106. For instance the user path may be extrapolated based on the speed and/or direction of the user, and may be assumed to continue over time.

At index (H), the distance between the mobile device 106 and the vehicle 102 is determined by the vehicle 102 to be within a predefined BLUETOOTH pairing distance. For example, this distance may be on the order of 20 meters, which is well within the BLUETOOTH transmission range 204. At index (I), a pairing process between the mobile device 106 and the vehicle 102 is performed. For instance, the BT 108 may initiate pairing with the BLEM 118 of the vehicle 102, which may send a pairing request back to the BT 108. At index (J), the mobile device 106 pairs with and connects to the vehicle 102.

Referring more specifically to FIG. 3B, at index (K) the mobile device 106 generates a passive key. For instance, the vehicle 102 and the mobile device 106 may share a symmetric encryption key or an encryption/decryption key pair to allow the vehicle 102 and the mobile device 106 to identify and authenticate each other for access to the vehicle 102. In an example, the passive key is generated by the passive key application 124 (e.g., provided by an original equipment manufacturer (OEM) of the vehicle 102 for installation to the mobile device 106). The generated passive key may be broadcast over the BLUETOOTH session between the mobile device 106 and the vehicle 102. The vehicle 102 decrypts the passive key and authenticates the mobile device 106 using the encryption key.

The mobile device 106 may also continue to broadcast PSM messages 202. This is shown throughout FIGS. 3B-3C as the periodic PSM messages 202 labeled at index (L).

At index (M), the mobile device 106 broadcasts the generated passive key over BLUETOOTH to the vehicle 102. At index (N), the vehicle 102 verifies the passive key and authenticates the user. For instance, the vehicle 102 may use the symmetric encryption key or the decryption key of the key pair to decrypt and authenticate the passive key. If the passive key is validated, then the data flow 300 may continue to index (O), where the mobile device 106 user is authenticated. Otherwise, the data flow 300 may end (not shown).

At index (P), the mobile device 106 sends broadcast health-CMD messages at regular interval after the pairing and authentication is successful as user approaching towards the vehicle 102. These health-CMD messages may include the RSSI and the distance between the vehicle 102 and mobile device 106 and may be broadcasted to the vehicle 102. The BLEM 118 of the vehicle 102 may continue monitoring the RSSI value of the received messages. Once the user approaches to within the UWB ranging distance to the vehicle 102, the mobile device 106 may generate an alert to the vehicle 102 (e.g., over Bluetooth) to start UWB ranging. The vehicle 102 may accordingly begin UWB ranging.

At index (Q), the continued monitoring of the location of the mobile device 106 with reference to the location of the vehicle 102 now indicates that the distance between the mobile device 106 and the vehicle 102 is within an UWB ranging distance. In an example, the UWB ranging distance may be on the order of 3-5 meters, as opposed to the BLUETOOTH pairing distance of on the order of 20 meters.

At index (R), the mobile device 106 initiates UWB ranging over the BLUETOOTH connection. For instance, the mobile device 106 may send a PSM message 202 to the vehicle 102 indicating the distance between the mobile device 106 and the vehicle 102, which is within the UWB ranging distance, where the vehicle 102 may determine at index(S) that the mobile device 106 is within the UWB ranging distance to the vehicle 102. Or the mobile device 106 may send a message specifically requesting activation of the UWB controller 120 for use in accurate positioning of the mobile device 106 in relation to the location of the vehicle 102, which may be received at index(S).

At index (T), the vehicle 102 activates the UWB controller 120 to perform UWB ranging of the location of the mobile device 106. At index (U), the vehicle 102 starts UWB ranging.

Referring more specifically to FIG. 3C, at index (V), the UWB controller 120 polls the mobile UWB transceiver 110 of the mobile device 106. For instance, a challenge packet (time of flight) is sent by the UWB controller 120 at index (W), is responded to by the mobile UWB transceiver 110 at index (X), and a response packed (time of flight) is returned to the UWB controller 120 at index (Y).

At index (Z), the distance between the mobile device 106 and the vehicle 102 is computed, e.g., based on the time between the sending of the challenge packet (time of flight) and the receipt of the response packet (time of flight), minus the responder time incurred by the mobile UWB transceiver 110 in replying, in view of the speed of light. In some examples, a trilateral (or more) positioning approach may be used via the antennas 116 of the vehicle 102 to determine a precise location of the mobile device 106.

At index ($\alpha$), this location (and/or distance) is provided to the ECUs 104 of the vehicle 102. At index ($\beta$), based on continued PSM messages 202 indicating the heading of the mobile device 106 that are sent to the vehicle 102, the heading of the mobile device 106 may also be provided to the ECUs 104 of the vehicle 102.

At index ($\gamma$), the ECUs 104 may operate features of the vehicle 102 based on the precise UWB-determined location of the mobile device 106 as well as based on the heading of the mobile device 106.

Figure 4A:
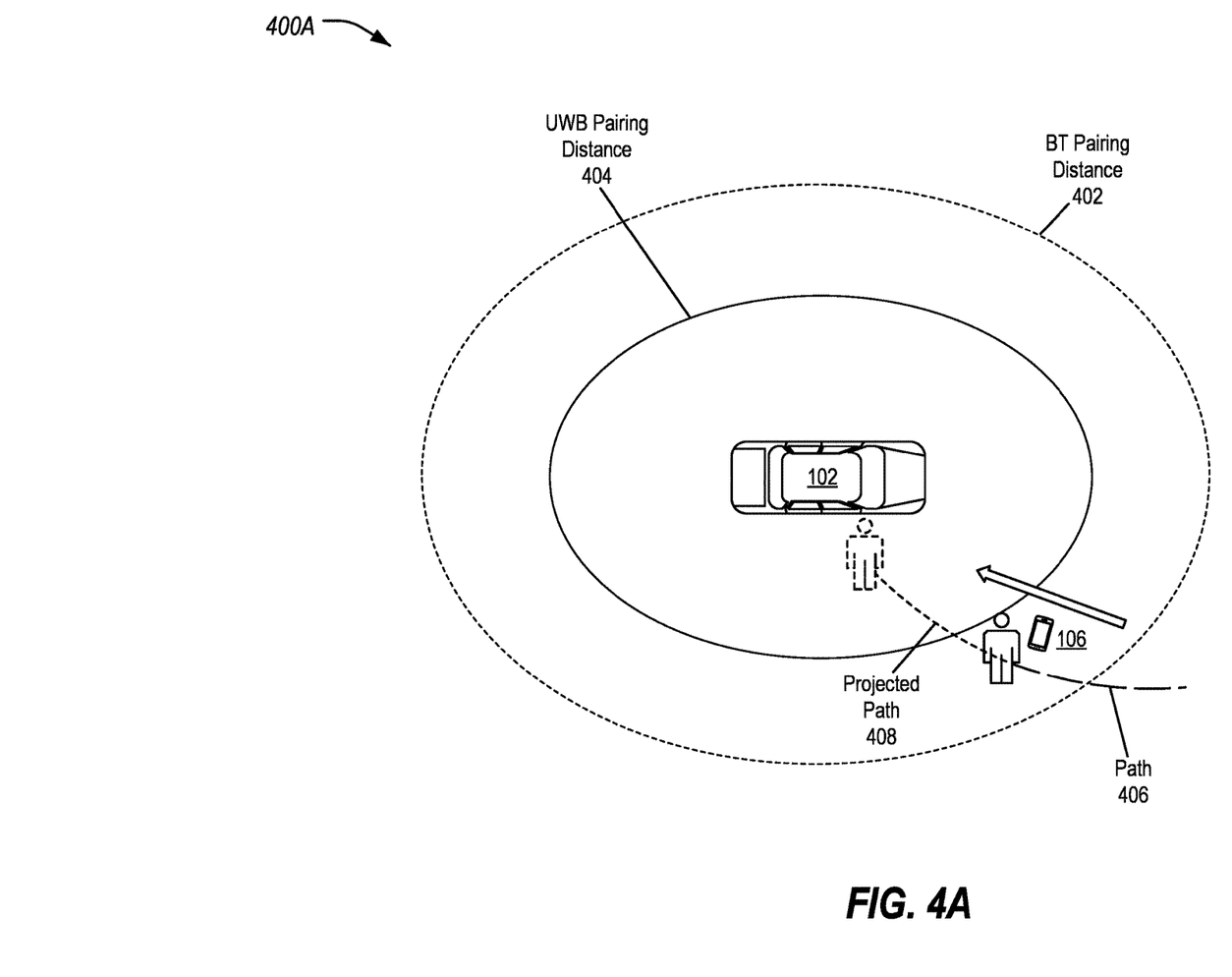
FIG. 4A illustrates an example of a user approach to the vehicle where the mobile device is predicted to be heading towards the vehicle.

FIG. 4A illustrates an example 400A of a user approach to the vehicle 102 where the mobile device 106 is predicted to be heading towards the vehicle 102. As shown, the vehicle 102 is surrounded by a BT pairing distance 402 and a smaller UWB ranging distance 404. The mobile device 106 is tracked along a path/heading 406, which is extrapolated out into projected path/heading 408. The projected path/heading 408 leads towards the vehicle 102.

Based on the user position and the user path prediction, the vehicle 102 may activate welcome lights and load user profiles (cabin adjustments, unlocking the vehicle 102, etc.) as the user approaches. In this example 400A, the UWB controller 120 may activate to continue the precise tracking of the mobile device 106 to the vehicle 102. When the mobile device 106 reaches the welcome distance, lighting features controlled by the ECUs 104 may be activated. Moreover, preconditioning of the cabin of the vehicle 102 may be initiated by the ECUs 104 in anticipation of entry to the vehicle 102 by the user. If the user reaches a short distance from the vehicle 102, e.g., less than one meter, then the vehicle 102 may turn on and unlock.

Figure 4B:
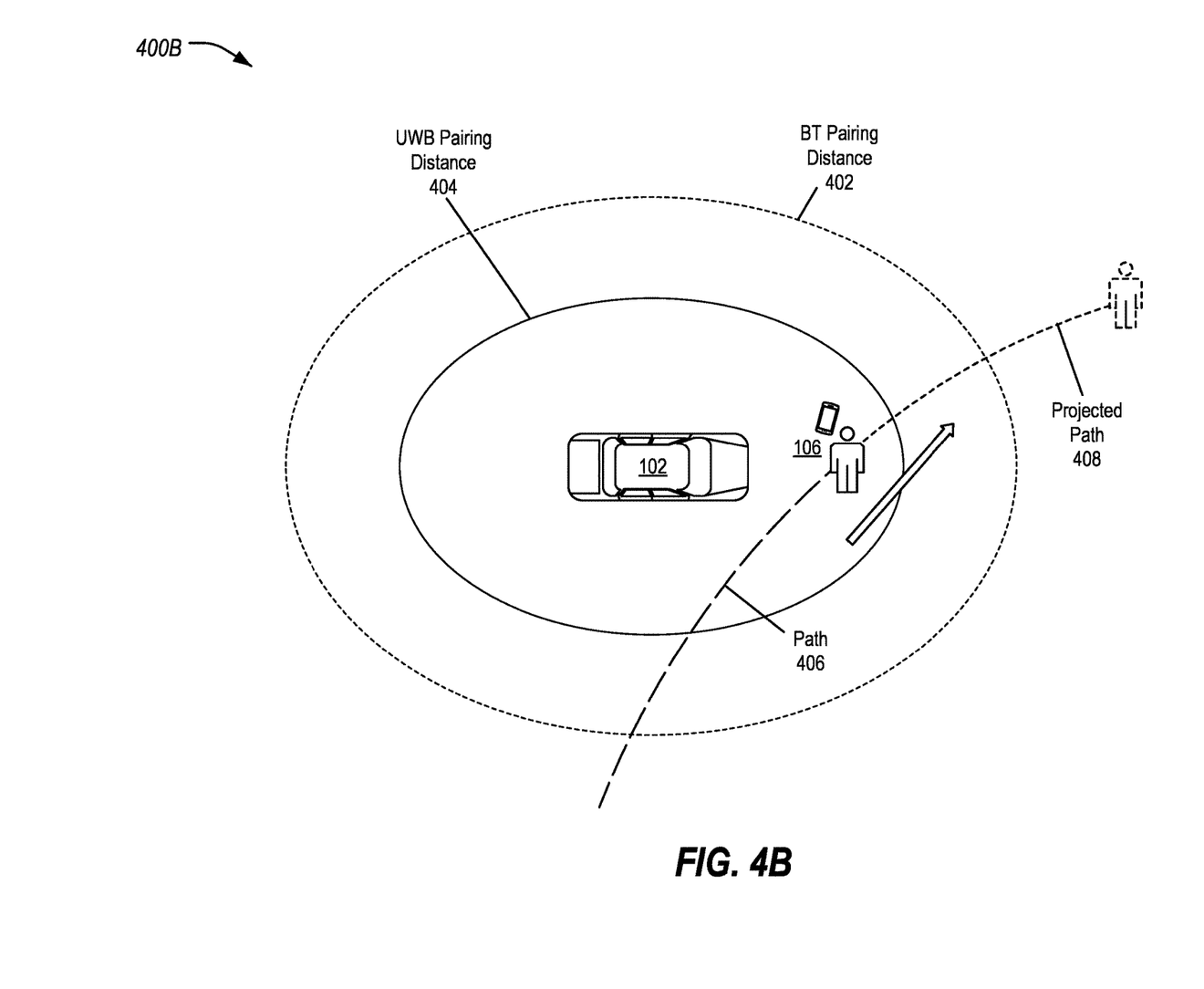
FIG. 4B illustrates an alternate example of a user approach to the vehicle where the mobile device is predicted to pass by the vehicle.

FIG. 4B illustrates an alternate example 400B of a user approach to the vehicle 102 where the mobile device 106 is predicted to pass by the vehicle 102. As shown, the vehicle 102 is again surrounded by the BT pairing distance 402 and the smaller UWB ranging distance 404. The mobile device 106 is tracked along a path/heading 406, which is extrapolated out into projected path/heading 408. The projected path/heading 408 shows that the mobile device 106 is likely to pass by the vehicle 102, not approach the vehicle 102.

As user heading and user path prediction is not towards the vehicle 102, the vehicle 102 may refrain from activating the welcome lights or other features, preventing vehicle 102 false alerts and saving vehicle 102 power. Thus, in this alternate example 400B, the UWB controller 120 may not be activated, nor would cabin preconditioning or welcome lighting be activated, no would the vehicle 102 be unlocked.

Figure 5:
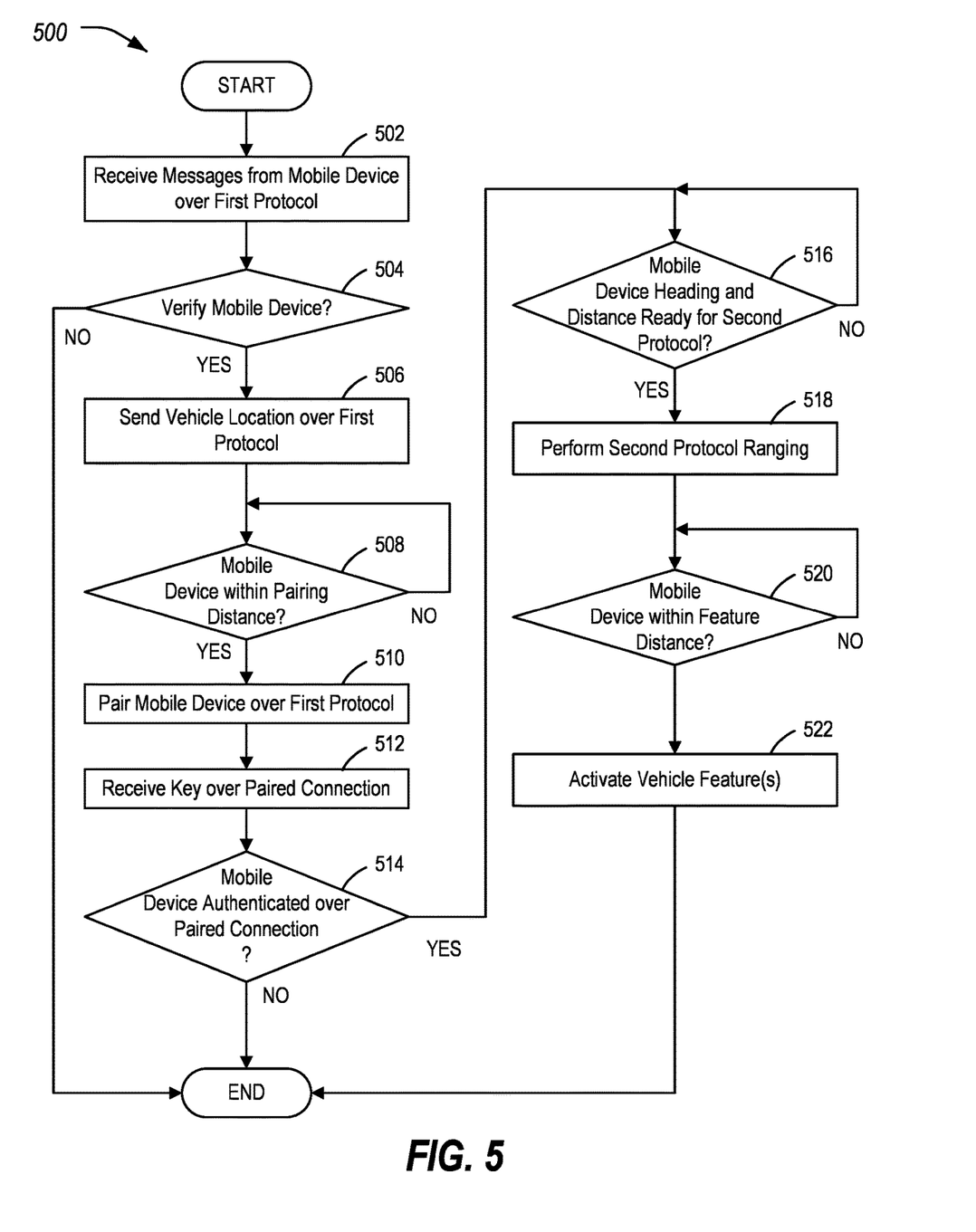
FIG. 5 illustrates an example process for performing the precise path-based passive entry.

FIG. 5 illustrates an example process 500 for performing the precise path-based passive entry. In an example, the process 500 may be performed by the components of the vehicle 102 in the context of the system 100 discussed in detail herein. For instance, the vehicle 102 may include a first transceiver configured to operate over a first protocol and one or more second transceivers configured to operate over a second protocol, the second protocol having shorter range but more precise positional accuracy than the first protocol. In one non-limiting example, the first protocol is BLUETOOTH, the second protocol is UWB, the first transceiver is the BLEM 118, and the second transceiver is the UWB controller 120.

At operation 502, the vehicle 102 receives messages from the mobile device 106 over a first protocol. Each of the messages may indicate a heading of the mobile device 106 and a current location of the mobile device 106. In an example, the messages may be PSM messages 202.

At operation 504, the vehicle 102 verifies the mobile device 106. In an example, the vehicle 102 may identify whether the PSM message 202 originated from a mobile device 106 that is in a friendly list of devices that are authorized to use the vehicle 102. For example, the PSM message 202 may include a MAC or other identifier of the mobile device 106 that may be looked up into a database of allowed identifiers. The vehicle 102 may perform this verification without having to pair with the mobile device 106. Responsive to the verification indicating that the mobile device 106 is on a list of authorized devices that may access the vehicle 102, control proceeds to operation 506. Otherwise, the process 500 ends.

At operation 506, the vehicle 102 sends the location of the vehicle 102 to the mobile device 106 over the first protocol. (Or, the mobile device 106 uses last known location of the vehicle 102 stored to the mobile device 106.). By using the location information of the vehicle 102 to the mobile device 106 may be able to determine its distance to the vehicle 102, e.g., using its GNSS controller 112.

At operation 508, the vehicle 102 determines whether the mobile device 106 is within a first distance to the vehicle 102. In an example, responsive to the mobile device 106 determining that the current location of the mobile device 106 is within the first threshold distance to the vehicle 102 (e.g., the BT pairing distance 402 discussed above), the mobile device 106 may send a request to the vehicle 102 to pair with the vehicle 102. In another example, the vehicle 102 may utilize the received PSM messages 202 which include the location of the mobile device 106 to determine (and/or confirm) that the mobile device 106 is within the first distance threshold of the vehicle 102. If so, control proceeds to operation 510 for the vehicle 102 to pair with the mobile device 106.

At operation 512, the vehicle 102 receives credentials over the paired connected with the mobile device 106. In an example, the mobile device 106 may generate a passive key and may send that key to the vehicle 102 for verification. At operation 514, the vehicle 102 determines whether the mobile device 106 is authenticated over the paired connection to the vehicle 102. In an example, the vehicle 102 verifies that the passive key received to the vehicle 102 is authorized. If so, control proceeds to operation 516, as the vehicle 102 may allow the one or more second transceivers to be activated. If the mobile device 106 is not verified, the process 500 ends.

At operation 516, the vehicle 102 determines whether the heading of the mobile device 106 is towards the vehicle 102 and also whether the distance between the mobile device 106 and the vehicle 102 is within a second distance to the vehicle 102. In an example, the heading may be retrieved from the PSM messages 202. In an example, the second distance may be the UWB ranging distance 404 discussed above. If the conditions are met, control passes to operation 518. Otherwise, control remains at operation 516.

At operation 518, the vehicle 102 performs ranging over the second protocol. In an example, the vehicle 102 may utilize the one or more second transceivers to perform time of flight distance measurement between the vehicle 102 and the mobile device 106 to obtain a more precise positional accuracy than possible using the first protocol.

At operation 520, the vehicle 102 determines whether the mobile device 106 is within a distance for activation of features of the vehicle 102. For instance, the distance may be a distance shorter than the second predefined distance. If such a distance is reached, control passes to operation 522.

At operation 522, the vehicle 102 activates the features of the vehicle 102. For instance, the vehicle 102 may activate welcome lights and load user profiles (cabin adjustments, unlocking the vehicle 102, etc.), the vehicle 102 may turn on and unlock, and or the vehicle 102 may initiate preconditioning of the cabin of the vehicle 102 in anticipation of entry to the vehicle 102 by the user. It should be noted that the distance for activation of different feature may differ. For instance, cabin preconditioning may begin at a further distance than activation of welcome lights or unlocking of the vehicle. After operation 522, the process 500 ends.

Thus, detecting the user approaching the vehicle 102 may be performed in advance of the user arriving at the vehicle 102 (e.g., 100 meters in advance) as compared to use of traditional key fobs which require a much closer approach. The disclosed approach also reduces or removes the possibility of false alerts of a user approaching the vehicle 102 when the user instead is passing by the vehicle 102, by using user path prediction, direction, and user location. By eliminating these false alerts, vehicle 102 energy usage may be reduced. The user mobile with its GNSS position and path prediction capabilities may also prepare the vehicle 102 for the arrival of the user, and give the vehicle 102 a sense of direction from where the user is arriving so that the vehicle 102 has more information rather than just RSSI value. For example, the vehicle 102 may turn on external UWB modules on only one side of the vehicle 102 if the vehicle 102 knows the direction from which the user is coming. The mobile device 106 based user path prediction and turn-on vehicle 102 may also be based on regular schedules and known patterns (e.g., user driving patterns) of the vehicle 102. For example, historical patterns of the user may be maintained by the vehicle 102 and used to generate a regular schedule of the vehicle 102. This schedule may be used to infer and/or aid in the location, time, and/or direction of user approach, or if the user at this time historically does not approach the vehicle 102 per the schedule.

Figure 6:
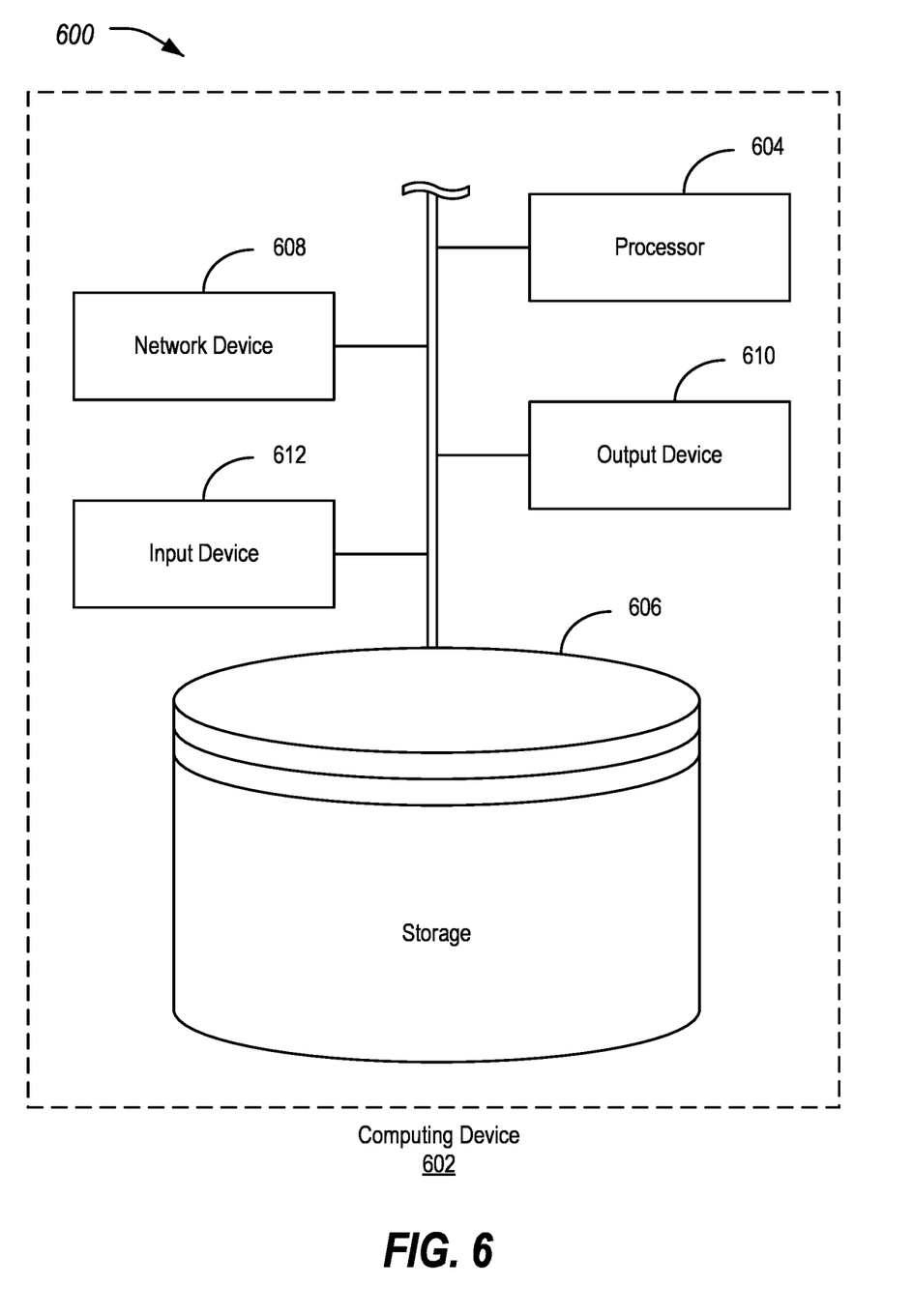
FIG. 6 illustrates an example of a computing device for implementing aspects of the precise path-based passive entry.

FIG. 6 illustrates an example 600 of a computing device 602 for implementing aspects of the precise path-based passive entry. Referring to FIG. 5, and with reference to FIGS. 1-5, the vehicle 102 and mobile device 106 may be examples of such computing devices 602. As shown, the computing device 602 includes a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the vehicles 102, mobile devices 106, and/or calibration data server 306 to send and/or receive data from external devices over networks. Examples of suitable network devices 608 include an Ethernet interface, a Wi-Fi transceiver, a cellular transceiver, or a BLUETOOTH or BLE transceiver, UWB transceiver, or other network adapter or peripheral interconnection device that receives data from another computer or external data storage device, which may be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodi-

What is claimed is:

1. A system for a path-based approach to passive vehicle entry, comprising:
a first transceiver of a vehicle configured to operate over a first protocol;
one or more second transceivers of the vehicle configured to operate over a second protocol, the second protocol having shorter range but more precise positional accuracy than the first protocol; and
one or more controllers of the vehicle, programmed to:
receive messages over the first protocol from a mobile device, each of the messages indicating a heading of the mobile device and a current location of the mobile device,
pair the vehicle and the mobile device responsive to the current location of the mobile device being within a first threshold distance to the vehicle, and
responsive to the heading indicating that the mobile device is headed towards the vehicle and the current location of the mobile device being within a second threshold distance from the vehicle, the second threshold distance being closer to the vehicle than the first threshold distance, activate the one or more second transceivers to perform time of flight distance measurement between the vehicle and the mobile device to obtain the more precise positional accuracy, and otherwise maintain the one or more second transceivers in a deactivated mode.

2. The system of claim 1, wherein the one or more controllers are further programmed to:
verify, without pairing the mobile device, that the mobile device is on a list of devices authorized to access the vehicle; and
responsive to the verification indicating that the mobile device is authorized to access the vehicle, send a location of the vehicle to the mobile device to allow the mobile device to determine the distance to the vehicle.

3. The system of claim 1, wherein the one or more controllers are further programmed to receive a request to pair the vehicle and the mobile device responsive to the mobile device determining that the current location of the mobile device is within the first threshold distance to the vehicle.

4. The system of claim 1, wherein the one or more controllers are further programmed to:
once paired, authenticate the mobile device using a passive key received to the vehicle from the mobile device; and
responsive to the vehicle verifying the passive key, allow the one or more second transceivers to be activated responsive to the heading indicating that the mobile device is headed towards the vehicle and the current location of the mobile device being within the second threshold distance from the vehicle.

5. The system of claim 1, wherein the one or more controllers are further programmed to:
activate vehicle features responsive to the current location of the mobile device being within a third threshold distance from the vehicle, the third threshold distance being closer to the vehicle than the second threshold distance.

6. The system of claim 5, wherein to activate the vehicle features includes to unlock the vehicle.

7. The system of claim 5, wherein to activate the vehicle features includes to precondition a cabin of the vehicle.

8. The system of claim 1, wherein the first protocol is BLUETOOTH and the second protocol is Ultra-Wide Band (UWB).

9. The system of claim 1, wherein the heading of the mobile device is extrapolated from a plurality of previous locations of the mobile device.

10. The system of claim 1, wherein the one or more controllers are further programmed to:
perform path prediction of the mobile device to determine a direction or location of approach of the mobile device; and
activate vehicle features in accordance with the direction or location of approach.

11. The system of claim 10, wherein the vehicle features include the one or more second transceivers, wherein only the one or more second transceivers on the side of the vehicle to which the mobile device is approaching are activated.

12. The system of claim 10, wherein the path prediction is used by the vehicle to prevent the activation of the vehicle features responsive to determining that the path prediction indicates that the mobile device will pass by the vehicle without approaching the vehicle, thereby inhibiting false alerts.

13. The system of claim 10, wherein the one or more controllers are further programmed to:
track usage patterns of the vehicle over time to determine a regular schedule of likely usage of the vehicle; and
utilize the schedule in combination with the path prediction to prevent the activation of the vehicle features responsive to determining that the path prediction at the current time based on the schedule indicates that the mobile device will pass by the vehicle without approaching the vehicle, thereby inhibiting false alerts.

14. A method for path-based approach to passive vehicle entry, comprising:
receiving, to a vehicle, messages over a first protocol from a mobile device, each of the messages indicating a heading of the mobile device and a current location of the mobile device;
pairing the vehicle and the mobile device responsive to the current location of the mobile device being within a first threshold distance to the vehicle; and
responsive to the heading indicating that the mobile device is headed towards the vehicle and the current location of the mobile device being within a second threshold distance from the vehicle, the second threshold distance being closer to the vehicle than the first threshold distance, activate one or more second transceivers over a second protocol to perform time of flight distance measurement between the vehicle and the mobile device to obtain more precise positional accuracy, and otherwise maintain the one or more second transceivers in a deactivated mode.

15. The method of claim 14, further comprising:
verifying, without pairing the mobile device, that the mobile device is on a list of devices authorized to access the vehicle; and
responsive to the verification indicating that the mobile device is authorized to access the vehicle, sending a location of the vehicle to the mobile device to allow the mobile device to determine the distance to the vehicle.

16. The method of claim 14, further comprising using, by the mobile device, a saved vehicle location to determine the distance to the vehicle.

17. The method of claim 14, further comprising receiving a request to pair the vehicle and the mobile device responsive to the mobile device determining that the current location of the mobile device is within the first threshold distance to the vehicle.

18. The method of claim 14, further comprising:
once paired, authenticating the mobile device using a passive key received to the vehicle from the mobile device; and
responsive to the vehicle verifying the passive key, allowing the one or more second transceivers to be activated responsive to the heading indicating that the mobile device is headed towards the vehicle and the current location of the mobile device being within the second threshold distance from the vehicle.

19. The method of claim 14, further comprising activating vehicle features responsive to the current location of the mobile device being within a third threshold distance from the vehicle, the third threshold distance being closer to the vehicle than the second threshold distance.

20. The method of claim 19, wherein activating the vehicle features includes to unlock the vehicle.

21. The method of claim 19, wherein activating the vehicle features includes to precondition a cabin of the vehicle.

22. The method of claim 14, wherein the first protocol is BLUETOOTH and the second protocol is Ultra-Wide Band (UWB).

23. The method of claim 14, wherein the heading of the mobile device is extrapolated from a plurality of previous locations of the mobile device and/or based on an entered destination from a navigation system of the mobile device.

24. The method of claim 14, further comprising:
performing path prediction of the mobile device to determine a direction or location of approach of the mobile device; and
activating vehicle features in accordance with the direction or location of approach.

25. The method of claim 24, wherein the vehicle features include the one or more second transceivers, wherein only the one or more second transceivers on the side of the vehicle to which the mobile device is approaching are activated.

26. The method of claim 24, wherein the path prediction is used by the vehicle to prevent the activation of the vehicle features responsive to determining that the path prediction indicates that the mobile device will pass by the vehicle without approaching the vehicle, thereby inhibiting false alerts.

27. The method of claim 24, further comprising:
tracking usage patterns of the vehicle over time to determine a regular schedule of likely usage of the vehicle; and
utilizing the schedule in combination with the path prediction to prevent the activation of the vehicle features responsive to determining that the path prediction at the current time based on the schedule indicates that the mobile device will pass by the vehicle without approaching the vehicle, thereby inhibiting false alerts.

28. A non-transitory computer-readable medium comprising instructions for a path-based approach to passive vehicle entry that, when executed by one or more controllers of a vehicle, cause the vehicle to perform operations including to:
receive messages over a first protocol from a mobile device, each of the messages indicating a heading of the mobile device and a current location of the mobile device;
verify, without pairing the mobile device, that the mobile device is on a list of devices authorized to access the vehicle;
responsive to the verification indicating that the mobile device is authorized to access the vehicle, send a location of the vehicle to the mobile device to allow the mobile device to determine its distance to the vehicle;
pair the vehicle and the mobile device responsive to the current location of the mobile device being within a first threshold distance to the vehicle;
once paired, authenticate the mobile device using a passive key received to the vehicle from the mobile device;
responsive to the vehicle verifying the passive key, allow one or more second transceivers operating over a second protocol to be activated responsive to the heading indicating that the mobile device is headed towards the vehicle and the current location of the mobile device being within a second threshold distance from the vehicle, the second threshold distance being closer to the vehicle than the first threshold distance; and
responsive to the heading indicating that the mobile device is headed towards the vehicle and the current location of the mobile device being within the second threshold distance from the vehicle, activate the one or more second transceivers to perform time of flight distance measurement between the vehicle and the mobile device to obtain a more precise positional accuracy, and otherwise maintain the one or more second transceivers in a deactivated mode.

29. The medium of claim 28, wherein the first protocol is BLUETOOTH and the second protocol is Ultra-Wide Band (UWB).

* * * * *